US008286245B2

(12) United States Patent
Samman

(10) Patent No.: US 8,286,245 B2
(45) Date of Patent: Oct. 9, 2012

(54) VIRUS PROTECTION IN AN INTERNET ENVIRONMENT

(75) Inventor: Ben Samman, Paris (FR)

(73) Assignee: F-Secure Oyj, Helsinki (FI)

( * ) Notice: Subject to any disclaimer, the term of this patent is extended or adjusted under 35 U.S.C. 154(b) by 2321 days.

(21) Appl. No.: 10/362,951

(22) PCT Filed: Aug. 20, 2001

(86) PCT No.: PCT/EP01/09642

§ 371 (c)(1),
(2), (4) Date: Feb. 28, 2003

(87) PCT Pub. No.: WO02/19066

PCT Pub. Date: Mar. 7, 2002

(65) Prior Publication Data

US 2003/0177397 A1 Sep. 18, 2003

(30) Foreign Application Priority Data

Aug. 31, 2000 (GB) .................................. 0021280.3

(51) Int. Cl.
*G06F 11/00* (2006.01)

(52) U.S. Cl. ................ 726/24; 726/22; 726/23; 726/25; 726/26; 726/27; 726/28; 726/29; 713/189; 713/190; 713/191; 713/192; 713/193; 713/194; 717/174; 717/175; 717/176; 717/177; 717/178; 705/51; 705/52; 705/53; 705/54

(58) Field of Classification Search .............. 726/22–29; 717/174–178; 705/51–54; 713/189–194
See application file for complete search history.

(56) References Cited

U.S. PATENT DOCUMENTS

| | | | | |
|---|---|---|---|---|
| 5,878,417 | A * | 3/1999 | Baldwin et al. | 707/10 |
| 6,088,803 | A | 7/2000 | Bakshi et al. | |
| 6,393,479 | B1 * | 5/2002 | Glommen et al. | 709/224 |
| 6,397,335 | B1 * | 5/2002 | Franczek et al. | 726/24 |
| 6,463,534 | B1 * | 10/2002 | Geiger et al. | 713/168 |
| 6,721,721 | B1 * | 4/2004 | Bates et al. | 707/1 |
| 6,728,886 | B1 * | 4/2004 | Ji et al. | 726/24 |
| 2002/0124100 | A1 * | 9/2002 | Adams | 709/232 |

FOREIGN PATENT DOCUMENTS

GB 2 316 206 A 2/1998

* cited by examiner

*Primary Examiner* — Edan Orgad
*Assistant Examiner* — Roderick Tolentino
(74) *Attorney, Agent, or Firm* — Squire Sanders (US) LLP

(57) ABSTRACT

A method of scanning data for viruses in a computer device, the device having a browser for rendering the data for use. The method comprises storing the data in a buffer memory accessible to said browser and creating an instance of a browser plugin, said plugin providing a virus scanning function or providing a route to a virus scanning function. The data is scanned for viruses using the instance of the plugin and, if no viruses are detected in the data, it is returned to the browser for rendering. If a virus is detected in the data, rendering of the data is inhibited.

8 Claims, 3 Drawing Sheets

VIRUS PROTECTION IN AN INTERNET ENVIRONMENT

The present invention relates to virus protection in an Internet environment and in particular, though not necessarily, to computer virus protection in a WAP system. More particularly, the present invention relates to a system where WAP data is transmitted between an origin server and a WAP browser of a mobile wireless device.

The last decade has seen a rapid growth in the number and use of mobile cellular telephones. More recently, wireless devices known as "communicators" have been introduced and combine the functionality of mobile telephones and Personal Digital Assistants (PDAs). It is expected that this area will undergo massive growth in the near future as new cellular telecommunication standards (e.g. HSCSD, GPRS, UMTS) make possible the high speed transfer of data across the wireless interface. The introduction of Wireless Application Protocol (WAP), which it is envisaged will be a globally adopted set of rules for delivering Internet-based content to mobile platforms, is also expected to add to the growth of this area by facilitating high speed mobile Internet access. WAP makes use of a new HTML-like programming language known as Wireless Markup Language (WML).

The next generation of mobile telephones are likely to resemble mini-computers rather than telephones per se. Also, whilst to date cellular telephones have been very much manufacturer specific in terms of both hardware and software, future wireless devices are likely to be built on a much more open platform. This will allow the introduction into the devices of third party applications and will farther fuel growth in much the same way as Microsoft Windows™ has done for personal computers.

It can be expected that the opening up of mobile wireless platforms will make such platforms susceptible to attack from so-called "malware" such as viruses, Trojan horses, and worms (referred to collectively hereinafter as "viruses") in much the same way as the openness of present day PCs and workstations makes them susceptible to malware attack. A number of mobile telephone viruses have recently been identified in the wild. In order to resist virus attacks, anti-virus software will be deployed into mobile platforms in much the same way as it has been deployed in the desktop environment.

A number of different desktop (i.e. server or workstation based) anti-virus applications are currently available. The majority of these applications rely upon a basic scanning engine which searches suspect files for the presence of predetermined virus signatures. These signatures are held in a database which must be constantly updated to reflect the most recently identified viruses. Typically, users regularly download replacement databases, either over the Internet, from a received e-mail, or from a CDROM or floppy disc. Users are also expected to update their software engines every so often in order to take advantage of new virus detection techniques (e.g. which may be required when a wholly new strain of virus is detected). It is expected that similar anti-virus solutions will be employed in wireless platforms, assuming that the problems caused by lack of memory space and processing power can be overcome.

Such conventional applications can be expected to function satisfactorily for standard file types downloaded or stored on a wireless platform. However, they may not be so efficient when dealing with executable binary (WML) files downloaded into a WAP browser. This is because such files are not stored in a conventional manner and an anti-virus application would not be able to access the files before they are executed.

A potential solution to this problem is to intercept executable files before they are passed to the WAP browser, i.e. before the data contained in the files is rendered. This may be done between the operating system level and the browser. It will be appreciated however that coding such a solution is extremely complex as it requires an interface at one end to the operating system and at the other end to the browser. The result is a long and complex code which occupies a large volume of memory space and which consumes a relatively large amount of processing resources merely to perform its interface functions. A further disadvantage of this solution is that it may involve the duplication of processing tasks. For example, a duplicate copy of received data may have to be unpacked and decoded prior to passing the original packed and coded data to the browser. The browser then repeats the unpacking and decoding operations prior to rendering the data.

It is an object of the present invention to overcome or at least mitigate the disadvantages of existing virus scanning systems note above. In particular, it is an object of the present invention to provide a virus scanning system which scans WAP, WWW, and/or related data before it is rendered for presentation on a computer device.

According to a first aspect of the present invention there is provided a method of scanning data for viruses in a computer device, the device having a browser for rendering the data for use, the method comprising:

storing the data in a buffer memory accessible to said browser:

creating an instance of a browser plugin, said plugin providing a virus scanning function or providing a route to a virus scanning function;

scanning the data for viruses using the instance of the plugin;

if no viruses are detected in the data, returning the data to the browser for rendering; and if a virus is detected in the data, inhibiting rendering of the data.

Embodiments of the present invention provide an elegant solution to the problem of virus scanning as the virus scanning plugin, or routing plugin, requires only a simple interface to the browser. The need to copy and buffer data, and the duplicated processing of data at the input to the browser is avoided. Data may be provided to the virus scanning plugin in a suitably pre-processed form. The pre-processing may be done by the browser or by an application or plugin called by the browser.

Preferably, the computer device is a mobile wireless platform such as a mobile telephone, communicator, palmtop computer etc, and said browser is a WAP browser. The data scanned may be an executable file or part thereof. Alternatively, the data scanned may be data associated with an executable file such as image data. The present invention is also applicable to WWW browsers such as Netscape Navigator™ and Microsoft Explorer™. In this case, the scanned data may be an HTML file, a part of an HTML file, or data associated with an HTML file.

The plugin of the present invention may comprise virus scanning functionality. Alternatively however, the instance of the plugin created by the browser may cause a separate virus scanning application to be opened. The plugin may then make the WML/HTML data accessible to the scanning application.

According to a second aspect of the present invention there is provided a mobile wireless device comprising a memory having a WAP browser application stored therein and a virus scanning browser plugin, wherein in use the WAP browser creates an instance of the virus scanning plugin for scanning WAP data prior to rendering the data.

According to a third aspect of the present invention there is provided a mobile wireless device comprising a memory having a WAP browser application stored therein, a browser plugin, and a virus scanning application, wherein in use the WAP browser creates an instance of the plugin, which instance makes WAP data available to the virus scanning application for virus scanning.

According to a fourth aspect of the present invention there is provided a computer memory encoded with executable instructions representing an Internet browser plugin, the executable instructions being arranged to cause a mobile wireless platform to scan WAP and or HTML data for viruses prior to rendering of the data for display on a display of the device.

Rather than scan data for viruses at a receiving wireless mobile platform, it is of course possible to scan data prior to sending to the platform over the air interface.

According to a fifth aspect of the present invention there is provided a method of scanning WAP data for viruses, the method comprising receiving WAP related data at a WAP gateway from an origin, the data being in an encrypted form, decrypting the data at the WAP gateway and scanning the data for viruses, and in the event that no viruses are found in the data, re-encrypting the data and sending the data to a destination.

Encrypted data may be received at the WAP gateway either from an origin server or from a mobile wireless platform, with the data being sent from the gateway to the other of the origin server or from a mobile wireless platform. Data sent between the WAP gateway and the mobile wireless platform may be encrypted according to the Wireless Transport Layer Security (WTLS) protocols. Data sent between the WAP gateway and the origin server may be encrypted using for example IPsec protocols.

For a better understanding of the present invention and in order to show how the same may be carried into effect reference will now be made, by way of example, to the accompanying drawings in which.

Figure 1:
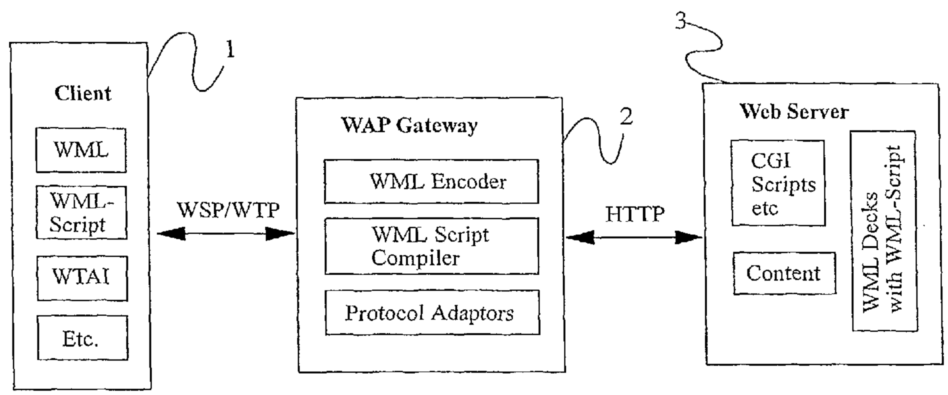
FIG. 1 illustrates schematically a system for delivering WAP data to a mobile wireless device.

There is illustrated in FIG. 1 a wireless mobile device or "client" 1 which may be for example a WAP enabled cellular telephone or communicator type device. The device 1 may also be for example a palm top computer coupled to a cellular telephone. It is assumed that the mobile device 1 belongs to a subscriber of a GSM cellular telecommunications network. Also illustrated in FIG. 1 are a WAP gateway 2 and an origin server 3. Typically, the WAP gateway 2 is located within the GSM network (although this need not be the case) and communicates with the mobile device 1 using the Wireless Session Protocol (WSP) and the Wireless Transaction Protocol (WTP)-WSP and WTP related data is carried between the mobile device 1 and the WAP gateway using a variety of transport mechanisms. The origin server 3—which is in some ways analogous to a WWW server—may be operated by a third party (e.g. content provider, bank, e-merchant etc.) and communicates with the WAP gateway 2 over the Internet using HTTP. As is well known, an end-to-end data connection can be established between the mobile device 1 and the origin server 3 via the WAP gateway 2.

Figure 2:
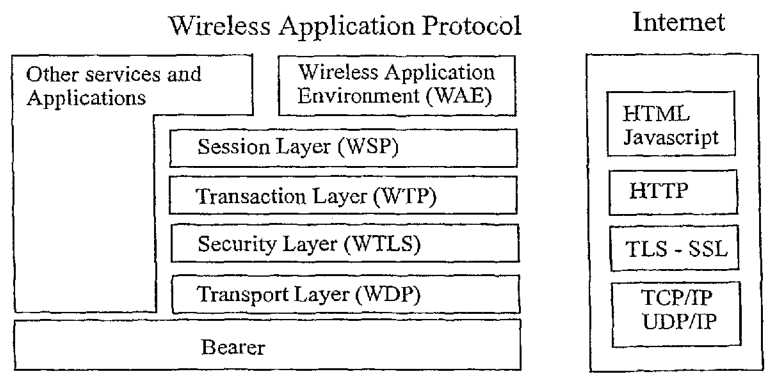
FIG. 2 illustrates the higher level protocol layers present at the WAP gateway.

FIG. 2 illustrates the higher level protocol layers present at the WAP gateway 2. The WAP layers represent the interface to the mobile device 1, whilst the Internet layers represent the interface to the origin server 3. It will be appreciated that peer WAP layers are present in the mobile device 1, whilst peer Internet layers are preset in the origin server 3.

Figure 3:
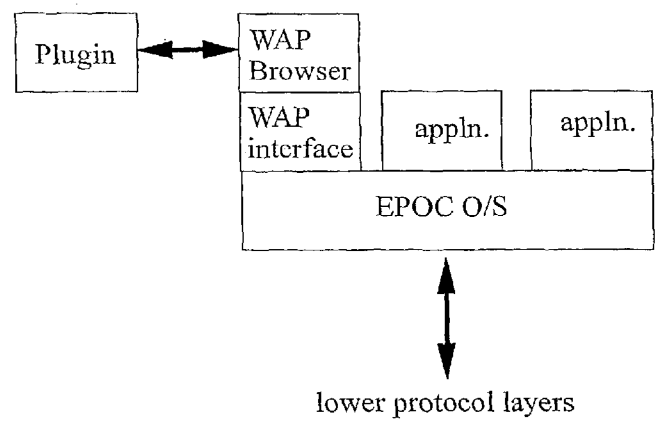
FIG. 3 illustrates schematically software installed in a mobile wireless device.
Figure 4:
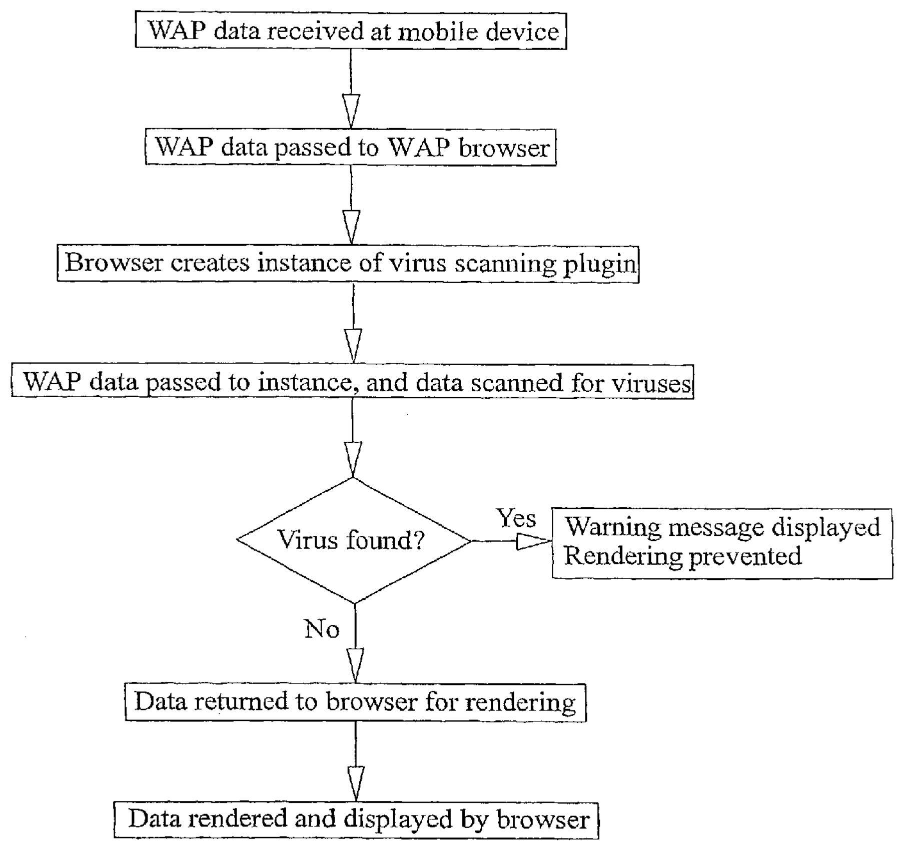
FIG. 4 is a flow diagram illustrating a method of scanning WAP data for viruses in a mobile wireless device.

FIG. 3 illustrates the organisation of a number of software components present in the memory of the mobile device 1. The core of the system is an operating system such as the EPOC operating system currently used on a number of mobile platforms. A number of applications are interfaced to the operating system. These applications might include for example a telephone application and a contacts database. Of particular interest here is a Wireless Application Protocol (WAP) browser which is used to allow WAP related data including executable WML files to be rendered and displayed on a display of the mobile device 1. The WAP data to be displayed is typically downloaded from a remote origin server such as the server 3 of FIG. 1. Alternatively however, WAP data may be read from a memory of the mobile device 1 or may be downloaded into the mobile device 1 from some other source, e.g. via a Bluetooth link.

The process of downloading WAP data from the origin server 3 may be initiated by the sending of a request from the mobile device 1 to the origin server 3, e.g. the user may enter a URL such as "wap.f-secure.com" into the address space of the browser. The request goes via the WAP gateway 2. The origin server 3 responds to receipt of the request by returning WAP data comprising an executable WML file and any associated files such as image and audio files. The WAP data is received at the mobile device 1. After processing by lower (GSM) layers, the WAP data is made available to the operating system. The operating system in turn makes the data available to the WAP browser, for example, the operating system may provide pointers to the location of the WAP data in certain memory buffers. It is possible that the received data will be encrypted, for example if Wireless Transport Layer Security (WTLS) is in use between the device 1 and the WAP gateway 7. In this case, the received WAP data must be decrypted. This could be done at the operating system level or in a lower layer, or by the browser.

In a conventional browser, when the browser is started it looks for installed plugins and creates a plugin library. A plugin is a program extension which connects to an application (or the operating system) in real time. Each plugin is associated in the created library with one or more MIME types. A MIME type is a code indicating a type of data. For example, MIME types are specified (by the IETF) for different video and audio formats. When an executable WML file is downloaded, the browser looks into the file to identify any MIME types. If a MIME type is present, the browser identifies any relevant plugin in the library, and creates an instance of the plugin. For virus scanning plugins, all WAP files should be scanned for malicious code regardless of MIME type as the MIME type is something which is written into a WAP page by the page creator (and can be easily altered). This may require a modification to the current WAP browser structure.

Once the instance of the plugin is created by the WAP browser, the browser makes the WAP data available to the plugin. This may be done by the browser passing memory buffer address pointers to the plugin. The plugin may use a scanning system similar to the F-Secure Anti-Virus for WAP Gateway™ system to scan the WAP data for viruses. Assuming that no viruses are identified by the scanning process, the WAP data is "returned" unmodified to the browser. The browser then renders the data for display in the normal way.

In the event that a virus is detected in the WAP data (or the presence of a virus is suspected) one of a number of actions may be taken. For example, the user of the device 1 may be notified by displaying a message on the device's display, and attempt may be made to "disinfect" the data, and/or a message may be returned to the WAP server 3 advising the server is sending out suspect data. In any case, the result is that the browser is prevented from rendering the data.

As an alternative to scanning WAP data at a mobile device, the scanning may be carried at the WAP gateway 2 using for example the F-Secure Anti-Virus for WAP Gateway™ system. This may present certain problems in so far as the data which must be scanned is encrypted for transmission between the origin server 3 and the device 1 and the scanning of encrypted data may be ineffective. However, it is possible to take advantage of a "white spot" which exists at the WAP gateway 2. More particularly, it may often be the case that data will be encrypted for transmission between the origin server 3 and the WAP gateway 2, for example where the corporation to which they belong is a bank. Encryption may be negotiated and conducted using IPsec. As already mentioned above, data sent between the WAP gateway 2 and the mobile device 1 may be encrypted if WTLS is in use. However, as the WAP gateway 2 is an end point for both encryption services, unencrypted data will be present at the WAP gateway (this is possible because the WAP gateway 2 is under the control of a trusted party, e.g. a telco or bank). Virus scanning can be effectively carried out at the WAP gateway 2.

It will be appreciated by the person of skill in the art that various modifications may be made to the above described embodiments without departing from the scope of the present invention.

The invention claimed is:

1. A method of scanning files for viruses in a computer device, the device having a browser for rendering a file for use, the method comprising:

downloading a file from the Internet into said browser and storing the file in a buffer memory accessible to said browser:

creating an instance of a browser plugin regardless of any MIME type identified within the file, said plugin providing a virus scanning function or providing a route to a virus scanning function;

providing pointers to the file location from the browser to the browser plugin and scanning the file for viruses using the instance of the plugin;

if no viruses are detected in the file, returning the file to the browser for rendering; and if a virus is detected in the file, inhibiting rendering of the file.

2. A method according to claim 1, wherein the computer device is a mobile wireless platform, and said browser is a WAP browser.

3. A method according to claim 2, wherein said file is an executable file.

4. A method according to claim 1, wherein the plugin comprises virus scanning functionality.

5. A method according to claim 1, wherein the instance of the plugin created by the browser causes a separate virus scanning application to be opened, and the plugin makes the file accessible to the scanning application.

6. A mobile wireless device comprising a memory having an Internet browser application stored therein and a virus scanning browser plugin, wherein in use the browser downloads a file from the Internet into the browser and stores it in a buffer memory accessible to the browser, creates an instance of the virus scanning plugin for scanning the file prior to rendering the file, regardless of any MIME type identified within the file, and provides pointers to the file location to the browser plugin.

7. A mobile wireless device comprising a memory having an Internet browser application stored therein, a browser plugin, and a virus scanning application, wherein in use the browser downloads a file from the Internet into the browser and stores it in a buffer memory accessible to the browser, creates an instance of the plugin regardless of any MIME type identified within the file, and provides pointers to the file location to the browser plugin, which instance makes file available to the virus scanning application for virus scanning.

8. A computer memory encoded with executable instructions representing an Internet browser plugin, the executable instructions being arranged to cause a mobile wireless platform to scan WAP and or HTML files for viruses prior to rendering of the files for display on a display of the device, regardless of any MIME type identified within the file.

* * * * *